(No Model.)

W. P. KOOKOGEY.
APPARATUS FOR CHARGING SECONDARY BATTERIES.

No. 410,111. Patented Aug. 27 1889.

WITNESSES:
Mary Keating.
George H. Sexton.

INVENTOR:
William Prescott Kookogey
BY
Salter S. Clark
his ATTORNEYS.

UNITED STATES PATENT OFFICE.

WILLIAM PRESCOTT KOOKOGEY, OF BROOKLYN, ASSIGNOR TO THE KOOKOGEY ELECTRIC COMPANY, OF NEW YORK, N. Y.

APPARATUS FOR CHARGING SECONDARY BATTERIES.

SPECIFICATION forming part of Letters Patent No. 410,111, dated August 27, 1889.

Application filed January 23, 1889. Serial No. 297,294. (No model.)

*To all whom it may concern:*

Be it known that I, WILLIAM PRESCOTT KOOKOGEY, of the city of Brooklyn, county of Kings, and State of New York, have invented new and useful Apparatus for Charging Storage-Batteries and other Purposes, of which the following is a specification.

My invention relates, principally, to the charging of a storage-battery while it is discharging along a working-line from a generator of lower electro-motive force by automatically connecting successive sections of the storage-battery therewith. It is, however, applicable to other purposes besides the charging of a storage-battery in sections, such as, for instance, successively lighting a series of lights or signals each for a given time.

In consists, as a whole and as applied to the charging of a storage-battery, of the combination of a generator and storage-battery, the latter being divided into sections, two series of stationary contacts connected with such sections, and two conductors or contact-points connected with the respective poles of the generator of which they form the respective terminals, adapted to move in unison, and thus by means of the stationary contacts arranged adjacent to them make contact successively with the successive sections of the storage-battery; also of the combination of a storage-battery, generator, stationary contacts leading to sections of the storage-battery, and synchronously-moving conductors, with an electro-depositing cell forming part of the main charging-circuit and having one of its plates movable and attached to one of the arms of a balance-beam, by the alternate movements of which balance, under the increased or decreased weight of the movable plate in the depositing-cell, the synchronously-moving conductors are caused or allowed to move in unison at regular intervals from one stationary contact to the succeeding one, the current through the depositing-cell being reversed at each change of the balance.

The principal purpose to which the invention is to be applied is to allow of the charge of a storage-battery by means of a lower electro-motive force than would be required to charge the entire battery connected in series, and also to do this while the battery as a whole is discharging.

The drawings and the following description are made with special reference to such use of the invention—that is, charging a storage-battery.

Figure 1:
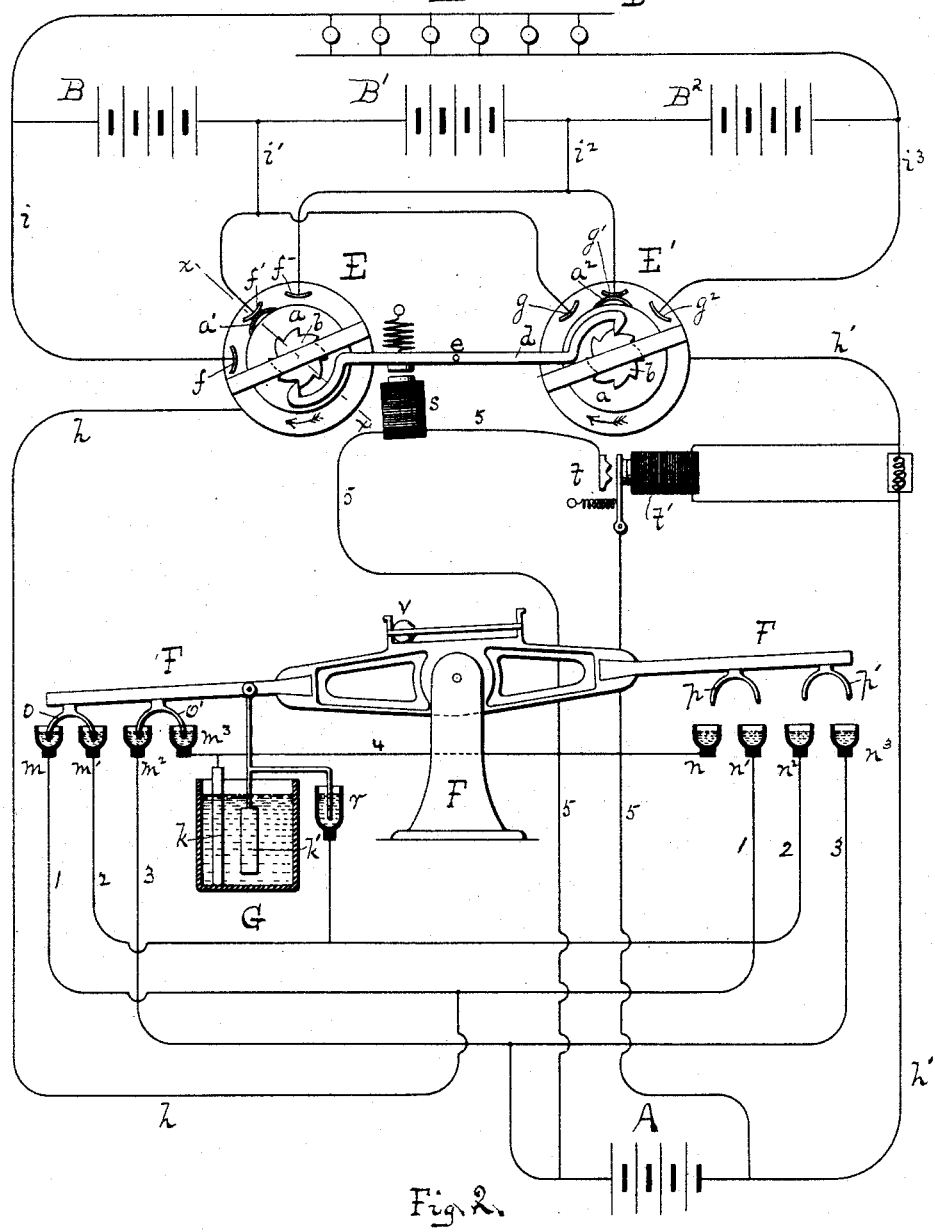
Figure 2:
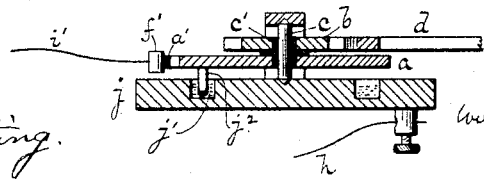

In the accompanying drawings, Figure 1 is a plan view of the whole device, and Fig. 2 is a sectional view, on the line $x\ x$ of Fig. 1, through one of the two similar devices by which the change is made from connection with one part of the storage-battery to connection with a succeeding part.

A is the generator, which may be a primary battery or a dynamo.

B B' B² are subdivisions of the storage-battery.

D is the working-line, such as a lamp-circuit.

E E' are two similar devices, (called "conductors" herein,) by which, for given intervals, electrical connection is successively maintained between the primary A and the successive portions B B' B² of the storage-battery without interrupting the discharge of the storage-battery along the working-line D.

F and G, with their connecting-wires and mercury-cups, constitute a device by which the change from one section of the storage-battery to another is accomplished automatically.

The device E (E' being similar to it in all parts) consists of a disk $a$, rigidly attached to a ratchet-wheel $b$, both of them revolving upon a pivot $c$ and actuated to revolve in the direction of the arrow by means of springs $c'$, attached thereto, or a weight, or any other appropriate device. The double pawl $d$ is pivoted at the point $e$, and connects with the ratchet $b$ of each device E E', serving to hold the disks $a$ against the action of the spring $c'$. The contact-pieces $a'$ and $a^2$ are fixed to corresponding points upon the circumference of the two disks $a$, and make connection successively, as the disks revolve, with the stationary contacts $f\ f'\ f^2$ and $g, g'$, and $g^2$. The disks $a$ are maintained in electrical connection with the primary A by means of the respective wires $h$ and $h'$. The stationary contacts $f\ f'\ f^2$ and $g\ g'\ g^2$ are electrically connected by means of the wires $i, i', i^2$, and $i^3$ with the storage-battery. The electricity is conducted from the base of the device E to the disk $a$ (see Fig. 2) in any appropriate manner. The manner shown in the drawings consists of an annular groove $j'$, cut in the upper surface of the base $j$, to contain mercury, into which a pin $j^2$, attached to the under side of the disk $a$, dips. There should be as many stationary contacts arranged around the disk $a$ as there are separate portions of the storage-battery to be charged. For the sake of clearness only three are shown in the drawings.

The operation of this part of the device is as follows: In the position shown in the drawings the portion $B'$ is being charged from the primary A, the current passing from the contact-piece $a'$ through contact $f'$, wire $i'$, cells $B'$, wire $i^2$, contacts $g'$ and $a^2$, through the corresponding disk $a$, back to the primary A. After a given interval the ratchet-wheels $b$ are released from the pawl $d$ for an instant, and the springs $c'$ within the devices E E' set them in motion in the direction of the arrows, until the contacts $a'$ $a^2$ come in contact with the contacts $f^2$ and $g^2$, respectively. The portion $B'$ is thereby cut off from the primary and the portion $B^2$ is connected therewith and begins to charge. The notches on the ratchet-wheels $b$ are made to correspond to the distance between the stationary contacts arranged around the circle. Thus each given portion of the storage-battery is made to charge for a given period, the remainder of the storage-battery being wholly disconnected from the primary, and this is done without interruption to the discharge along the working-line D and whether the working-line is at work or at rest. The operation would be the same in principle if the contacts $f f'$ $g g'$, &c., were made movable and the disks $a$ stationary. The main idea is that the movements of the two sets shall be synchronous. This might be done by a single spring or weight actuating both of them. With the device shown they must act together, even though the springs $c'$ are independent of each other and not of the same strength, for the disks $a$ would each time move the distance between the successive teeth whenever the pawl $d$ was released.

The electro-motive force of the generator A may bear any relation to the electro-motive force of the whole storage-battery B B' $B^2$. It must, however, to be effective, be greater than the electro-motive force of the successive portions.

The times at which the pawl $d$ shall be released from the ratchets $b$ may be regulated in any way, so far as this part of the invention is concerned. It may be done by hand and at regular or irregular intervals. The remainder of the drawings, not already described, shows one method of accomplishing this automatically and at regular intervals.

G is an electro-depositing cell having one plate $k$ stationary and the other plate $k'$ movable vertically and attached to one end of the beam of the balance F. This operates the balance by the alternate increase and decrease of the weight of the plate $k'$ under the action of the electric current through it. The cups $m\,m'\;m^2\,m^3\,n\;n'\,n^2\,n^3$ are stationary mercury-cups connected with each other, as shown, by the wires 1, 2, 3, and 4. Circuit closers $o$ $o'$ and $p\,p'$, attached to the opposite ends of the balance-beam F, serve to open and close the circuits at given intervals from the battery A through the devices E E', and also to reverse the current at each change through the depositing-cell G. The mercury-cup $r$ merely serves as a convenient means of electrically connecting the movable plate $k'$ with the wire 2, the circuit never being broken at the cup $r$. The circuit-closers $o\;o'\;p\;p'$ are insulated from each other. The ball $v$, rolling from one side to the other of the balance F, as the balance changes, serves to keep the balance in each alternate position for a given interval of charge. A local circuit 5, which may come either from a local battery or as a shunt from the primary A, as shown in the drawings, serves when complete to energize the magnet $s$; but this local circuit 5 is normally broken at the point $t$ by means of a magnet $t'$, which is continuously energized by the charging-current coming from the primary A.

The operation of the balance F and the various circuits connected with it is as follows: In the position shown in the drawings the charging-current from the battery A passes through wire 3, cups $m^2\,m^3$, depositing-cell G, cup $r$, wire 2, cups $m'\;m$, wires $i$ and $h$, device E, cells B', device E', wire $h'$, back to battery A. During this operation the current passes through depositing-cell G and removes a certain amount of metal from the movable plate $k'$. This continues until the weight of the plate $k'$ is so much reduced that that end of the balance rises and the ball $v$ rolls to the other end of its inclosure. During the operation of change there is a moment or two while all the circuit-closers $o\;o'$ and $p\;p'$ are disconnected from their several mercury-cups. This breaks the main charging-current, de-energizes the magnet $t'$, and thereby energizes the magnet $s$ by completing the local circuit 5 at the point $t$. The magnet $s$ thereupon attracts an armature upon the pawl $d$ and releases the pawl $d$ from the ratchet-wheels $b$. As soon as the balance is in the opposite position the circuit is completed, as before, from the primary A, through the devices E and E' and the succeeding portion $B^2$ of the storage-battery. The magnet $t'$ is energized as soon as the charging-current is again started. This breaks the local circuit 5, and thereby de-energizes the magnet $s$, so that the pawl $d$ is released in time to catch upon the succeeding notch upon the ratchet-wheels $b$; but the change of the balance has reversed the current through the depositing-cell G, so that metal is thereupon deposited upon the plate $k'$. This continues until the weight of the plate $k'$ is sufficient to change the balance again, when the same operations as before takes place.

The sections B B' B² of the storage-battery are shown as connected in series. It is evident, however, that the principle of connecting a generator or other main circuit successively with a series of other circuits by means of the synchronous devices E E', whether automatically or otherwise, is applicable as well where the successive circuits are entirely independent of one another, or where they are connected in parallel groups, as where they all constitute a single series with points of division between the sections.

I claim as my invention—

1. An electric generator, two circular series of stationary contacts in which two corresponding contacts (one in each series) constitute the two ends, respectively, of a corresponding number of different circuits, two disks bearing the terminals of the generator and being continuously actuated to revolve, and thus make successive connection between the generator and the successive circuits, ratchets attached to such disks with notches corresponding in number to the number of separate circuits, and a double pawl connecting with such ratchets and when released allowing the two disks to carry the terminals of the generator from one circuit to the succeeding one, substantially as and for the purpose described.

2. In combination with an electric generator and main circuit, two synchronously-moving conductors or contact-points constituting the terminals of the generator, and two series of stationary contacts constituting the respective ends of a series of different circuits, the combination of a local circuit which, when energized, causes the conductors to move, a magnet in the main circuit holding the local circuit open, a depositing-cell in the main circuit, having one plate movable and attached to one end of a balance-beam, circuit closers and breakers on each arm of the balance so arranged that when the balance changes the main circuit is broken for a moment, and circuit-connections between the circuit closers and breakers, by which at each change of the balance the course of the current through the depositing-cell is reversed, substantially as and for the purpose described.

3. The combination of an electric generator and main circuit containing a magnet, a local circuit containing another magnet and also containing a circuit-breaker, which is held open by the magnet in the main circuit when the main circuit is complete, an electro-depositing cell having one plate movable and attached to one arm of a balance-beam, a series of circuit breakers and closers in the main circuit upon each arm of the balance, the circuit being broken for a moment whenever the balance changes, circuit-connections by which the main current is led through the depositing-cell in opposite directions, according to the position of the balance, and a rolling ball upon the top of the balance retaining the balance in each alternate position for a given period, substantially as and for the purpose described.

4. The combination of an electric generator, a storage-battery connected with a working-line, such storage-battery being also divided into sections, two synchronously-moving conductors or contact-points, constituting the terminals of the generator, and two series of stationary contacts arranged adjacent to the moving conductors, in which the two corresponding contacts in the two series constitute the two ends, respectively, of a circuit including one section of the storage-battery, substantially as and for the purpose described.

5. The combination of an electric generator, a storage-battery connected with a working-line, such storage-battery being also divided into sections, two synchronously-moving conductors or contact-points, constituting the terminals of the generator, two series of stationary contacts arranged adjacent to the two conductors, in which the two corresponding contacts in the two series constitute the two ends, respectively, of a circuit including one of the sections of the storage-battery, a local circuit which, when energized, causes the conductors to move, a magnet in the main circuit holding the local circuit open, a depositing-cell in the main circuit having one plate movable and attached to one end of a balance-beam, circuit closers and breakers on each arm of the balance, so arranged that when the balance changes the main circuit is broken for a moment, and circuit-connections between the circuit closers and breakers, by which at each change of the balance the course of the current through the depositing-cell is reversed, substantially as and for the purpose described.

In witness whereof I have hereunto put my hand, in the presence of witnesses, this 29th day of December, 1888.

WILLIAM PRESCOTT KOOKOGEY.

Witnesses:
 GEORGE C. BRAINERD,
 WALTER S. LOGAN,
 SALTER STORRS CLARK.